US012770188B2

(12) United States Patent
Asami

(10) Patent No.: US 12,770,188 B2
(45) Date of Patent: Oct. 20, 2026

(54) TRADE MANAGEMENT PROGRAM, INFORMATION PROCESSING APPARATUS, AND TRADE MANAGEMENT SYSTEM

(71) Applicant: Magic Dimension Studio, Inc., Tokyo (JP)

(72) Inventor: Yukihiro Asami, Tokyo (JP)

(73) Assignee: Magic Dimension Studio, Inc., Tokyo (JP)

( * ) Notice: Subject to any disclaimer, the term of this patent is extended or adjusted under 35 U.S.C. 154(b) by 0 days.

(21) Appl. No.: 18/623,003

(22) Filed: Mar. 31, 2024

(65) Prior Publication Data

US 2024/0249358 A1 Jul. 25, 2024

Related U.S. Application Data

(63) Continuation of application No. PCT/JP2021/036439, filed on Oct. 1, 2021.

(51) Int. Cl.
*G06Q 40/04* (2012.01)

(52) U.S. Cl.
CPC .................................... *G06Q 40/04* (2013.01)

(58) Field of Classification Search
CPC ...................................................... G06Q 40/04
See application file for complete search history.

(56) References Cited

U.S. PATENT DOCUMENTS 6,829,590 B1 * 12/2004 Greener ................ G06Q 40/04 705/31
2004/0260640 A1 * 12/2004 Crosthwaite ........... G06Q 40/03 705/37
2011/0276515 A1 * 11/2011 Crosthwaite ........... G06Q 40/04 705/37
2015/0073967 A1 3/2015 Katsuyama et al.
2016/0035027 A1 2/2016 Mercer et al.
2016/0086268 A1 3/2016 Labuszewski et al.
(Continued)

FOREIGN PATENT DOCUMENTS

JP 2015-532986 A 11/2015
JP 2020-166905 A 10/2020
(Continued)

OTHER PUBLICATIONS

"Do You Have Servers In Different Geographic Locations?" Compevo Communications. Jul. 30, 2021. (Year: 2021).*
(Continued)

*Primary Examiner* — Elda G Milef
(74) *Attorney, Agent, or Firm* — HAUPTMAN HAM, LLP

(57) ABSTRACT

To provide a trade management program, an information processing apparatus, and a trade management system that equally handle trade orders having a communication gap. A trade management system includes: trade servers 2*a*, 2*b*, and 2*c* that receive orders from clients 4$a_1$ and 4$a_2$, 4$b_1$ and 4$b_2$, and 4$c_1$ and 4$c_2$ installed in the same regions A, B, and C, respectively; and a trade aggregation server 1 including a reception means for receiving order information including an application time of an order from each of the trade servers 2*a*, 2*b*, and 2*c* installed in different regions, and a determination means for determining the order information within a period set with a predetermined closing time.

20 Claims, 6 Drawing Sheets

(56) References Cited

U.S. PATENT DOCUMENTS

| | | | | |
|---|---|---|---|---|
| 2017/0293980 | A1* | 10/2017 | Phillips | G06Q 40/08 |
| 2020/0342536 | A1* | 10/2020 | Bonig | G06Q 10/1093 |
| 2021/0049695 | A1 | 2/2021 | Ma et al. | |
| 2024/0070784 | A1* | 2/2024 | Stevens | G06Q 40/04 |

FOREIGN PATENT DOCUMENTS

| | | | | | |
|---|---|---|---|---|---|
| WO | WO-0159661 | A2 | * | 8/2001 | G06Q 40/04 |
| WO | WO-2019010392 | A1 | * | 1/2019 | G06Q 20/3827 |

OTHER PUBLICATIONS

Office Action in JP application No. 2022-506369, dated Mailed Apr. 19, 2022, 8pp.
Takanobu Mizuta et al., "Investigation of Frequent Batch Auctions using Agent Based Model", Japan Exchange Group, JPX Working Paper, Dec. 8, 2016, 30pp.
Written Opinion in PCT/JP2021/036439, mailed Dec. 21, 2021, 8pp.(Note: correction to translation of the author's name is included on p. 3.).
Office Action in JP Application No. 2022-108969, mailed Nov. 19, 2024. 8pp.

* cited by examiner

FIG. 4

111

| ORDER ID | USER ID | ORDER TYPE | TARGET | PRICE | QUANTITY | TIME |
|---|---|---|---|---|---|---|
| O001 | A | BUYING | SECURITIES 1 | 100 YEN | 10 SHARES | 9:30 |
| O002 | B | BUYING | SECURITIES 1 | 101 YEN | 10 SHARES | 9:31 |
| O002 | C | SELLING | SECURITIES 1 | 99 YEN | 10 SHARES | 9:32 |
| ⋮ | ⋮ | ⋮ | ⋮ | ⋮ | ⋮ | ⋮ |

FIG. 5

113

| RESULT ID | R001 | | | | | | |
|---|---|---|---|---|---|---|---|
| CLOSING TIME | 9:30 ~ 9:33 | | | | | | |
| ORDER ID | USER ID | ORDER TYPE | TARGET | PRICE | QUANTITY | TIME | SUCCESS OR FAILURE |
| 001 | A | BUYING | SECURITIES 1 | 100 YEN | 10 SHARES | 9:30 | O |
| 002 | B | BUYING | SECURITIES 1 | 101 YEN | 10 SHARES | 9:31 | O |
| 002 | C | SELLING | SECURITIES 1 | 99 YEN | 10 SHARES | 9:32 | X |
| ... | ... | ... | ... | ... | ... | ... | ... |

TRADE MANAGEMENT PROGRAM, INFORMATION PROCESSING APPARATUS, AND TRADE MANAGEMENT SYSTEM

CROSS-REFERENCE TO RELATED APPLICATIONS

The present application is a bypass continuation application based on and claims the benefit of priority from PCT Application No. PCT/JP2021/036439 filed Oct. 1, 2021, the entire contents of which are incorporated herein by reference.

TECHNICAL FIELD

Aspects of embodiments relate to a trade management program, an information processing apparatus, and a trade management system.

BACKGROUND ART

As conventional technology, a trade management system that executes time-synchronized trades at a plurality of exchanges has been proposed (see, for example, Patent Literature 1).

The trade management system disclosed in Patent Literature 1 includes a trade server, a plurality of financial exchanges, and a plurality of servers each of which is associated with an exchange, disposed at the same position as the exchange, and provided with a high-accuracy clock. The trade server divides a large trade order into a plurality of smaller trade orders, and combines each smaller trade order with a trade execution time. The trade server transmits a financial trade instruction to each server disposed at the same location based on each combined smaller trade order and trade execution time. When the high-accuracy clock of each server reaches the trade execution time, all servers submit smaller trade instructions to respective financial exchanges substantially at the same time.

CITATION LIST

Patent Literature

Patent Literature 1: JP 2020-166905 A

SUMMARY OF INVENTION

Technical Problem

According to the trade management system of Patent Literature 1, although the large trade order is divided into the small trade orders and the small trade orders are submitted to a plurality of exchanges at the same time, a case of handling trade orders from a plurality of regions for one exchange is not described. In a case of handling the trade orders from the plurality of regions for one exchange, there is a problem that a communication time lag occurs according to a geographical distance between the exchange and each region, and a trade order from a region far from the exchange refers to information older than a trade order from a close region by a time lag. Particularly, an attack from a high-frequency trader aiming at the time lag, that is, a communication gap becomes a problem.

Accordingly, an object of embodiments is to provide a trade management program, an information processing apparatus, and a trade management system that equally handle trade orders having a communication gap.

Solution to Problem

In order to achieve the above object, one aspect of the embodiments provides the following trade management program, information processing apparatus, and trade management system.

Aspects of a first embodiment include a trade management program for implementing functions as: a reception means for receiving order information including an application time of an order from each of a plurality of trade servers, which receive orders from clients installed in the same region and are installed in different regions; and a determination means for determining the order information for each predetermined period.

Aspects of a second embodiment include the trade management program according to the first embodiment, wherein each of the plurality of trade servers includes a clock module calibrated so as to be the same time, and the application time is described in the order information by the clock module.

Aspects of a third embodiment include the trade management program according to the second embodiment, wherein the clock module has a secret key, creates a token from the secret key, and includes the token in the order information together with the application time.

Aspects of a fourth embodiment include the trade management program according to the third embodiment, wherein the trade management program further implements a function as a verification means for verifying the order information using the token.

Aspects of a fifth embodiment include the trade management program according to any one of the first embodiment to the fourth embodiment, wherein a determination result of the determination means is output as trade result information.

Aspects of a sixth embodiment include the trade management program according to any one of the first embodiment to the fifth embodiment, wherein when it is detected that information affecting a next order does not arrive at one or more regions, or when it is detected that there is a difference in time from arrival to an order even if the information arrives, the determination means causes a closing time of the predetermined period in a region other than the one or more regions to be earlier than closing times of the one or more regions.

Aspects of a seventh embodiment include the trade management program according to the fifth embodiment, wherein the determination means refers to the trade result information, and in a case where a fraud or fraud attempt is detected, the determination means causes a closing time of the predetermined period of a client having made the fraud or fraud attempt to be earlier than closing times of the other clients.

Aspects of a eighth embodiment include a trade aggregation server including: a reception means for receiving order information including an application time of an order from each of a plurality of trade servers, which receive orders from clients installed in the same region and are installed in different regions; and a determination means for determining the order information for each predetermined period.

Aspects of a ninth embodiment include a trade management system including: trade servers which receive orders from clients installed in the same region; and a trade aggregation server including a reception means for receiving order information including an application time of an order from each of a plurality of the trade servers installed in different regions, and a determination means for determining the order information for each predetermined period.

Advantageous Effects of Invention

According to the first, the eighth, and the ninth embodiments, it is possible to equally handle trade orders having a communication gap.

According to the second embodiment, each of the plurality of trade servers includes the clock module calibrated so as to be the same time, and the application time can be included in the order information by the clock module.

According to the third embodiment, the clock module has the secret key, and can create the token from the secret key and include the token in the order information together with the application time.

According to the fourth embodiment, the order information can be verified using the token.

According to the fifth embodiment, the determination result of the determination means can be output as the trade result information.

According to the sixth embodiment, when it is detected that information affecting a next order does not arrive at one or more regions, or when it is detected that there is a difference in time from arrival to an order even if the information arrives, it is possible to cause a closing time of the predetermined period in a region other than the one or more regions to be earlier than closing times of the one or more regions.

According to the seventh embodiment, in a case where a fraud or fraud attempt is detected with reference to the trade result information, it is possible to cause a closing time of the predetermined period of a client having made the fraud or fraud attempt to be earlier than closing times of the other clients.

BRIEF DESCRIPTION OF DRAWINGS

FIG. 4 is a schematic diagram illustrating a configuration example of order information.

FIG. 5 is a schematic diagram illustrating a configuration example of trade result information.

DESCRIPTION OF EMBODIMENTS

Embodiment (Configuration of Trade Management System)

Figure 1:
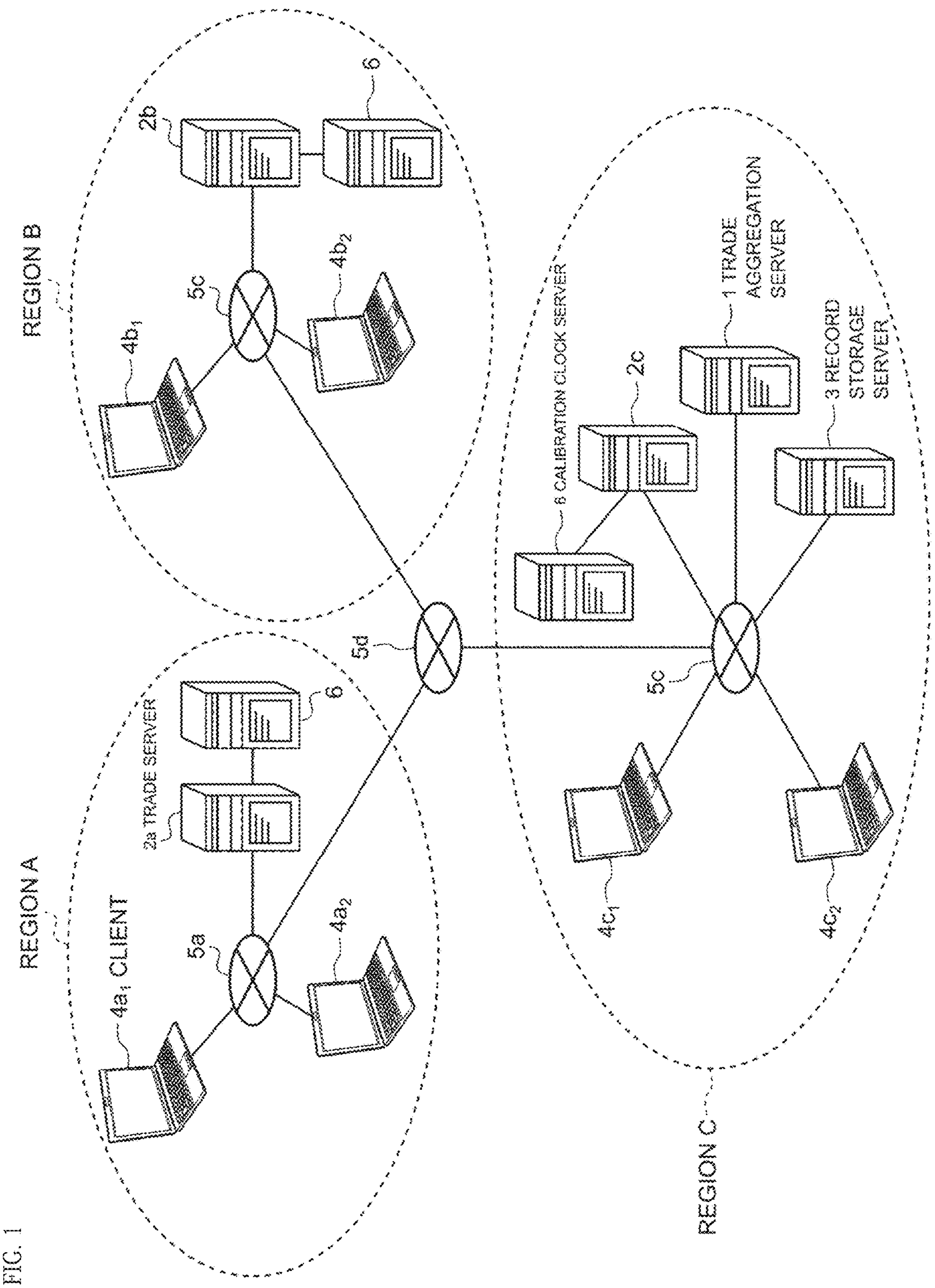
FIG. 1 is a schematic diagram illustrating an example of a configuration of a trade management system according to an embodiment.

FIG. 1 is a schematic diagram illustrating an example of a configuration of a trade management system according to an embodiment.

The trade management system is configured by connecting a trade aggregation server 1, trade servers 2*a*, 2*b*, 2*c* . . . , a record storage server 3, and clients $4a_1$, $4a_2$, $4b_1$, $4b_2$, $4c_1$, $4c_2$ . . . via networks 5*a*, 5*b*, 5*c*, and 5*d* in a mutually communicable manner. Here, each of the clients $4a_1$, $4a_2$, $4b_1$, $4b_2$, $4c_1$, $4c_2$ . . . is operated by a user who performs a trade. Note that the trade server 2*a* and the clients $4a_1$ and $4a_2$ are installed in a region A, the trade server 2*b* and the clients $4b_1$ and $4b_2$ are installed in a region B, the trade aggregation server 1, the trade server 2*c*, the record storage server 3, and the clients $4c_1$ and $4c_2$ are installed in a region C, and the region A, the region B, and the region C are remote places, respectively. Here, for example, in a case where the trade aggregation server 1 in the region C is used as a reference, the remote place means that the regions are separated by at least a difference in a time required for communication between the trade server 2*a* in the region A and the trade aggregation server 1 (or a time required for communication between the trade server 2*b* in the region B and the trade aggregation server 1) as compared with a time required for communication between the trade server 2*c* in the region C and the trade aggregation server 1, and specifically means that the regions are separated by a difference (communication gap) in a time required for notification and acquisition of information. In addition, although the example in which the trade aggregation server 1 and the record storage server 3 are installed in the region C is illustrated, the trade aggregation server 1 and the record storage server 3 may be installed in the region A and the region B, or may be installed in a region other than the region A, the region B, and the region C. In addition, it is assumed that a time required for communication between the regions is longer than a time required for communication within the region.

The trade aggregation server 1 is a server type information processing apparatus that aggregates orders from the trade servers 2*a*, 2*b*, 2*c*, . . . in the respective regions, and includes electronic components such as a central processing unit (CPU) having a function for processing information and nonvolatile and volatile memories in a main body.

The trade server 2*a* (2*b* and 2*c*) is a server type information processing apparatus that receives orders from the clients $4a_1$ and $4a_2$ ($4b_1$, $4b_2$, $4c_1$, and $4c_2$) in each region, and includes a precision clock module such as an atomic clock in addition to electronic components such as a CPU having a function for processing information and nonvolatile and volatile memories in a main body.

Each of the clients $4a_1$, $4a_2$, $4b_1$, $4b_2$, $4c_1$, $4c_2$ . . . is an information processing apparatus such as a personal computer (PC), and includes electronic components such as a CPU having a function for processing information and nonvolatile and volatile memories in a main body.

The networks 5*a*, 5*b*, 5*c*, and 5*d* are communication networks capable of high-speed communication, and are, for example, wired or wireless communication networks such as the Internet, an intranet, and a local area network (LAN).

A calibration clock server 6 has a high-accuracy clock such as an atomic clock, is connected to each of the trade servers 2*a*, 2*b*, and 2*c* by, for example, a serial cable, and periodically calibrates the time of the clock module. Specifically, the calibration clock server 6 periodically transmits calibration information to the trade servers 2*a*, 2*b*, and 2*c*. The times of the time modules of the trade servers 2*a*, 2*b*, and 2*c* are unified to, for example, the time of the region C in which the trade aggregation server 1 is disposed among the regions in which the calibration clock servers 6 are disposed. However, the times of the time modules of the trade servers 2*a*, 2*b*, and 2*c* may be the time of any region as long as the times are unified. Note that although FIG. 1 illustrates a configuration in which the calibration clock server 6 is installed in each of the regions A, B, and C, the calibration clock server 6 may be installed in any of the regions A, B, and C to calibrate the times of the clock modules of the trade servers 2*a*, 2*b*, and 2*c*. However, the calibration clock server 6 may be installed in any of the regions A, B, and C to perform calibration via a network with the trade servers 2*a*, 2*b*, and 2*c* in the regions where the calibration clock server 6 is not installed. For this reason, the calibration is performed by estimating the latency of the network, which may cause an error. Therefore, the calibration clock server 6 is preferably disposed in each of the regions A, B, and C from the viewpoint of accuracy. The calibration may be performed not only in a server format but also by periodically carrying calibration devices to the trade servers 2*a*, 2*b*, and 2*c* and connecting them. In addition, a method using GPS time information, a method using a radio clock system, or the like may be adopted.

In the above configuration, as an example, the trade aggregation server 1 aggregates the order received by the trade server 2*a* from the clients $4a_1$ and $4a_2$, the order received by the trade server 2*b* from the clients $4b_1$ and $4b_2$, and the order received by the trade server 2*a* from the clients $4c_1$ and $4c_2$, verifies the order, closes the order for each predetermined period (for example, 1 second to 60 seconds), and determines the order within the period to establish or disestablish the trade. In addition, the trade aggregation server 1 records a trade record in the record storage server 3, and the record storage server 3 notifies the trade servers 2*a*, 2*b*, and 2*c* of a trade result. These operations are repeatedly performed in the predetermined period described above. Note that, in the predetermined period, a current trade cannot be performed unless it is known whether or not the trade is successful in the previous trade. Therefore, it is considered that the predetermined period is desirably about one second in implementation. When the number of clients is small, it is considered that the liquidity of a financial product can be secured even if a period of 60 seconds or 60 seconds or more is set. In addition, it is possible to reduce information gap of the current trade using the previous trade result (plate information) by setting the predetermined period large, and it is possible to perform the trade at a higher frequency by setting the predetermined period small. Hereinafter, a more detailed configuration will be described, and a detailed operation will be described later.

(Configuration of Trade Aggregation Server)

Figure 2:
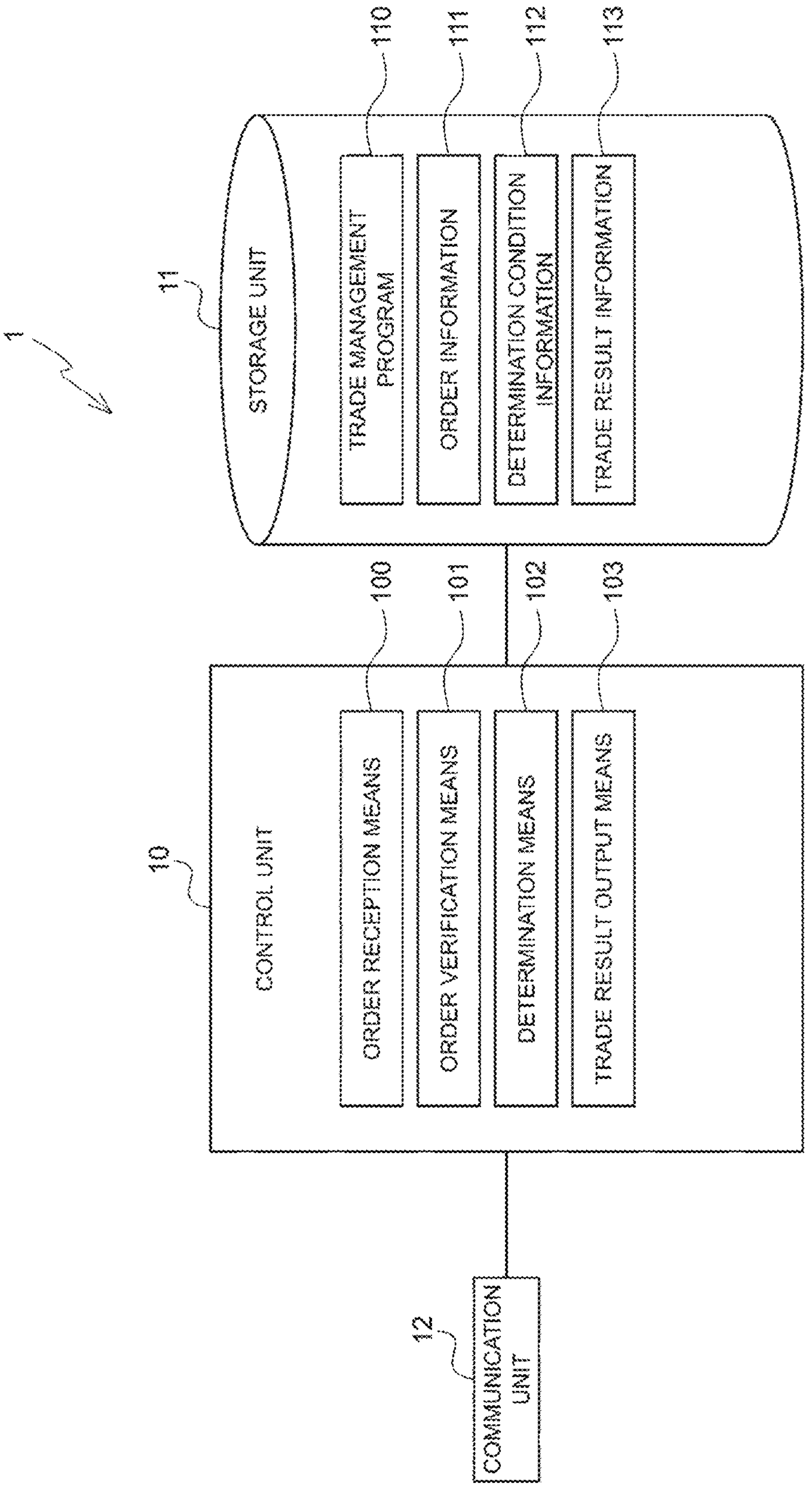
FIG. 2 is a block diagram illustrating a configuration example of a trade aggregation server according to the embodiment.

FIG. 2 is a block diagram illustrating a configuration example of the trade aggregation server 1 according to the embodiment.

The trade aggregation server 1 includes a control unit 10 that includes a CPU and the like, controls each unit, and executes various programs, a storage unit 11 that includes a storage medium such as a nonvolatile memory and stores information, and a communication unit 12 that communicates with the outside via a network 5*c*. The trade aggregation server 1 further includes a volatile memory (not illustrated).

The control unit 10 functions as an order reception means 100, an order verification means 101, a determination means 102, a trade result output means 103, and the like by executing a trade management program 110 to be described later.

The order reception means 100 receives order information including verification tokens transmitted from the trade servers 2*a*, 2*b*, and 2*c*, and stores the order information in the storage unit 11 as order information 111.

The order verification means 101 confirms whether or not an application time described in the order information 111 corresponds to an order submitted within a predetermined period (from a previous closing time to a current closing time), and verifies the order information 111 using the verification token. A verification method will be described later.

The determination means 102 determines the order information 111 verified by the order verification means 101 with reference to determination condition information 112 in which determination conditions are set, determines a determined price, a seller, and a buyer, and stores the determination result in the storage unit 11 as trade result information 113.

The trade result output means 103 outputs the trade result information 113 to the record storage server 3.

The storage unit 11 stores the trade management program 110 for causing the control unit 10 to operate as each means 100 to 103 described above, the order information 111, the determination condition information 112, the trade result information 113, and the like.

(Configuration of Information Processing Apparatus)

Figure 3:
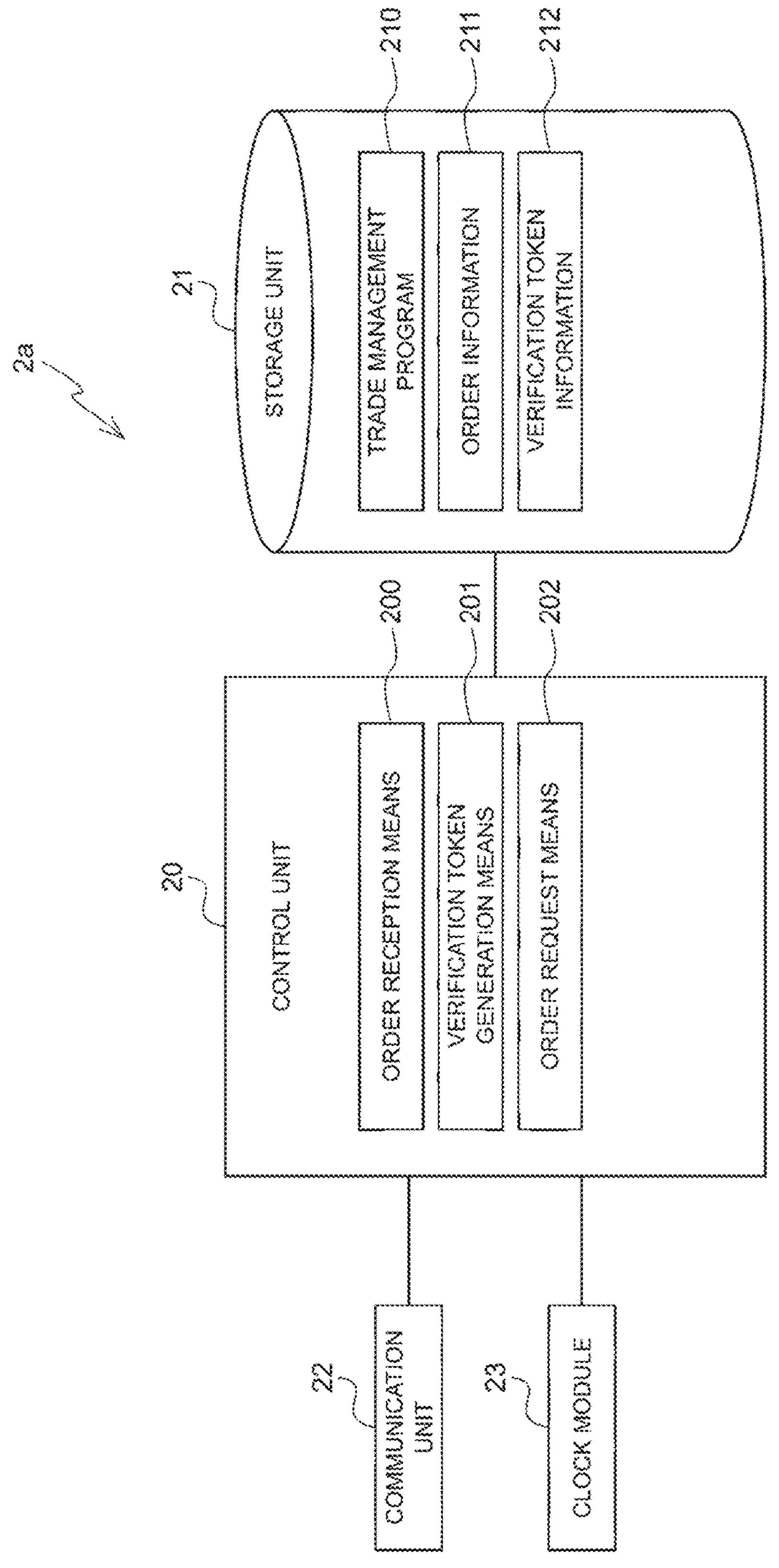
FIG. 3 is a block diagram illustrating a configuration example of a trade server according to the embodiment.

FIG. 3 is a block diagram illustrating a configuration example of the trade server 2*a* according to the embodiment. Note that, since the trade servers 2*b* and 2*c* have a configuration common to the trade server 2*a*, description thereof is omitted.

The trade server 2*a* includes a control unit 20 that includes a CPU and the like, controls each unit, and executes various programs, a storage unit 21 that includes a storage medium such as a nonvolatile memory and stores information, a communication unit 22 that communicates with the outside via a network, and a high-accuracy clock module 23 using an atomic clock and the like. The trade server 2*a* further includes a volatile memory (not illustrated).

The control unit 20 functions as an order reception means 200, a verification token generation means 201, an order request means 202, and the like by executing a trade management program 210 to be described later.

The order reception means 200 receives orders from the clients $4a_1$ and $4a_2$ and stores the orders in the storage unit 21 as order information 211 in which order content has been described.

By making an inquiry to the clock module 23, the verification token generation means 201 acquires time information at timing when the order reception means 200 receives an order and a token to be described later, describes the time information in the order information 211, and stores the token in the storage unit 21 as the verification token information 212.

The order request means 202 transmits an order request to the trade aggregation server 1 together with a token (that is, the signed order information 211) to be a combination of the order information 211 and the verification token information 212.

The storage unit 21 stores the trade management program 210 for causing the control unit 20 to operate as each means 200 to 202 described above, the order information 211, the verification token information 212, and the like.

The clock module 12 returns time information in response to the inquiry, stores a secret key in a storage unit provided inside, generates a token by using the secret key in response to the inquiry of the verification token generation means 201, and outputs the time information and the token to the verification token generation means 201.

FIG. 4 is a schematic diagram illustrating a configuration example of the order information 111.

The order information 111 includes an order ID for identifying an order, a user ID for identifying a user who has made the order, an order type indicating a type of the order, an order target, a price, a quantity, and a time which is an application time (time information). It is assumed that the order information 111 further includes a token (not illustrated).

FIG. 5 is a schematic diagram illustrating a configuration example of the trade result information 113.

The trade result information 113 includes a result ID for identifying a trade result, a closing time indicating an end time of a period of the trade, an order ID, a user ID, an order type, a target, a price, a quantity, a time which is an application time, and success or failure indicating whether or not the order has been established.

(Operation of Information Processing Apparatus)

Next, the operation of the present embodiment will be described separately for (1) the overall operation and (2) the determination operation.

(1) Overall Operation

Figure 6:
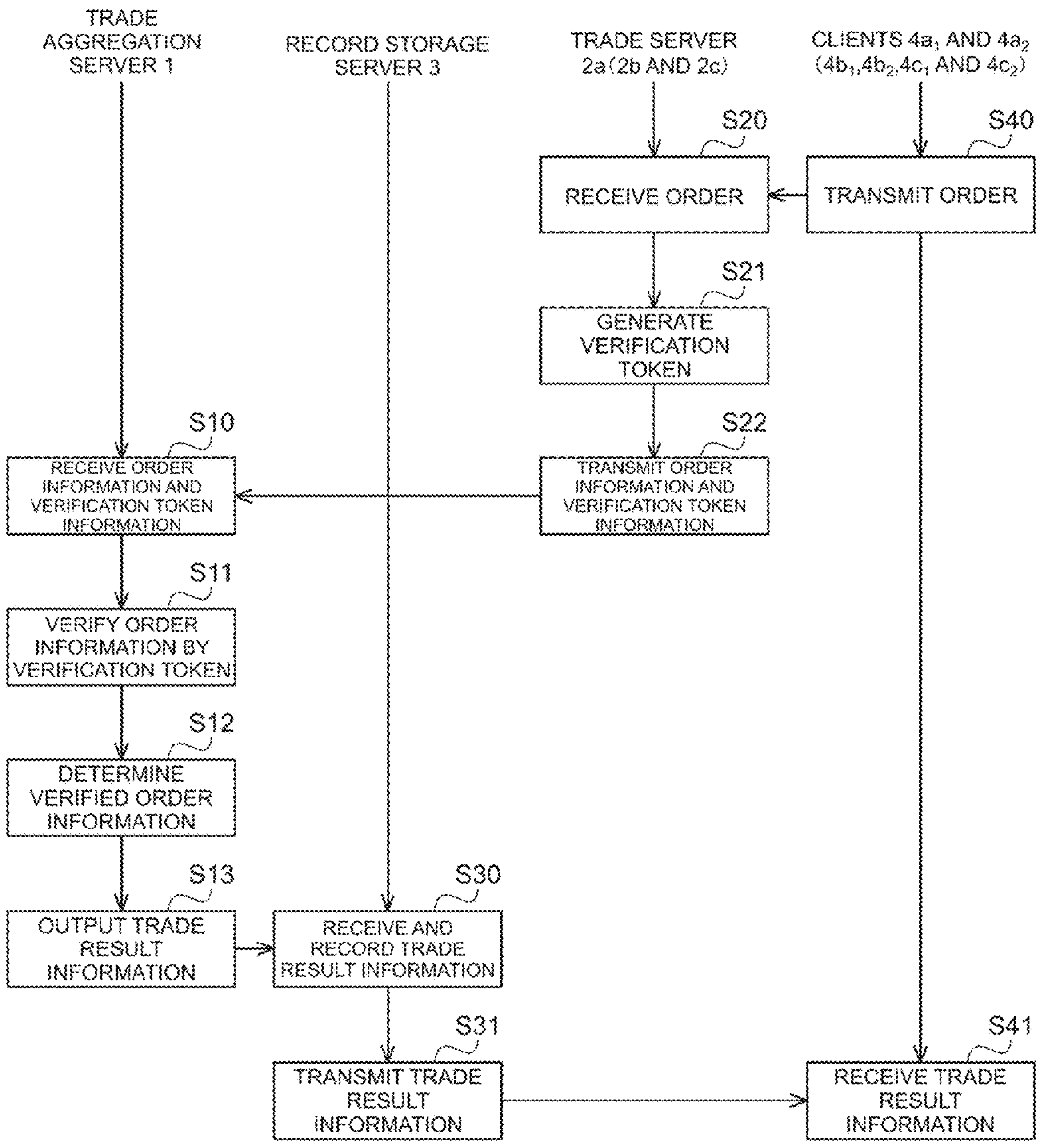
FIG. 6 is a flowchart illustrating an overall operation of the trade management system.

FIG. 6 is a flowchart illustrating the overall operation of the trade management system.

Users who desire to perform a trade in the region A operate the clients 4$a_1$ and 4$a_2$ (hereinafter, the same applies to the clients 4$b_1$ and 4$b_2$ in the region B, the clients 4$c_1$ and 4$c_2$ in the region C . . . ), respectively, to perform an order to buy or sell desired securities. The clients 4$a_1$ and 4$a_2$ transmit the order to the trade server 2$a$ in response to the order operation (S40). Here, it is assumed that the order is transmitted to the (closest) trade server in the region such as to the trade server 2$b$ in the case of the clients 4$b_1$ and 4$b_2$ in the region B, or to the trade server 2$c$ in the case of the clients 4$c_1$ and 4$c_2$ in the region C.

The order reception means 200 of the trade server 2$a$ receives orders from the clients 4$a_1$ and 4$a_2$ and stores the orders in the storage unit 21 as the order information 211 (S20).

Next, the verification token generation means 201 of the trade server 2$a$ acquires the token and the time information at the timing when the order reception means 200 receives the order by making an inquiry to the clock module 23, describes the time information in the order information 211, and stores the token in the storage unit 21 as the verification token information 212 (S21).

Next, the order request means 202 of the trade server 2$a$ transmits an order request to the trade aggregation server 1 at every predetermined closing time (for example, every few seconds, every few minutes, etc.) together with a token to be a combination of the order information 211 and the verification token information 212. Note that the timing of order request transmission may be immediately upon completion of generation of the order information 211 and the verification token information 212, or may be predetermined intervals. The order request means 202 of the trade server 2$a$ preferably transmits the order request promptly after the closing time. However, in a case where the determination start time of the trade aggregation server 1 can be delayed, the order request may be transmitted so as to arrive at the trade aggregation server 1 by the determination start time.

Next, the order reception means 100 of the trade aggregation server 1 receives the order information and the verification token transmitted from each of the trade servers 2$a$, 2$b$, and 2$c$, and stores the order information and the verification token in the storage unit 11 as the order information 111 (S10).

Next, the order verification means 101 of the trade aggregation server 1 verifies the verification token of the order information 111 (S11). Specifically, the verification token that is a signature is verified using public keys of the trade servers 2$a$, 2$b$, and 2$c$.

Next, the determination means 102 of the trade aggregation server 1 determines the order information 111 verified by the order verification means 101 with reference to the determination condition information 112 in which the determination conditions are set for the order information 111 included in the predetermined period for each predetermined period (from the previous closing time to the current closing time), determines a determined price, a seller, and a buyer, and stores the determination result in the storage unit 11 as the trade result information 113 (S12). A specific determination operation will be described in "(3) Determination Operation".

Next, the trade result output means 103 of the trade aggregation server 1 outputs the determination result of the period to the record storage server 3 as the trade result information 113 (S13).

The record storage server 3 receives and records the trade result information 113 from the trade aggregation server 1 (S30), and transmits all or a part of the trade result information 113 to the clients 4$a_1$ and 4$a_2$ (S31).

The clients 4$a_1$ and 4$a_2$ receive the trade result information 113 (S41), and display the trade results on display units as plate information. The user confirms the trade results displayed on the display units of the clients 4$a_1$ and 4$a_2$. The confirmation timing may be timing for each trade, or may be timing referred to by the clients 4$a_1$ and 4$a_2$ as necessary.

(2) Determination Operation

The determination means 102 of the trade aggregation server 1 performs determination by the following method as an example of the conditions described in the determination condition information 112.

(2-1)

The determination means 102 of the trade aggregation server 1 sequentially matches a highest price buying order and a lowest price selling order among the order information 111 included in the predetermined period, and sets an intermediate value between limit prices of the selling and buying orders as the determined price. As the intermediate value, for example, the determination means 102 may calculate the average by (highest price+lowest price)/2, may calculate the average by ((square root of highest price+square root of lowest price)/2)^2, or may calculate the average by another average value calculation method to be generally used.

(2-2)

In addition, as another determination operation, the determination means 102 of the trade aggregation server 1 sequentially matches the highest price buying order and the lowest price selling order among the order information 111 included in the predetermined period, and sets an intermediate value between the limit prices of the finally matched selling and buying orders as the determined price.

(2-3)

In addition, as other determination operation, the determination means 102 of the trade aggregation server 1 presents the determined price in advance from information regarding a market condition, information of previous selling and buying orders, and the like, and receives and determines bids for the buying order and the selling order. In a case where either the selling or the buying is insufficient, the determination is performed in order from the drawing or the priority determined in advance. Note that, in a case where there are not sufficient selling and buying orders, the determination may be performed by price information of another market. The determination means 102 of the trade aggregation server 1 determines the determined price to be presented in advance as follows. For example, when there are sufficient selling and buying orders, the highest price buying order and the lowest price selling order are matched based on information of the previous bid record, and an intermediate value between the finally matched selling price and buying price is set as price information to be presented next time.

Effects of Embodiment

According to the above-described embodiment, orders from the clients 4$a_1$, 4$a_2$, 4$b_1$, 4$b_2$, 4$c_1$, and 4$c_2$ in the respective regions are received by the trade servers 2*a*, 2*b*, and 2*c* provided with the clock module indicating the time unified in the plurality of regions A, B, and C, the order reception time is set to the time of the clock module of the trade servers 2*a*, 2*b*, and 2*c*, the orders from the trade servers 2*a*, 2*b*, and 2*c* are aggregated, and the determination is performed for each predetermined period. Therefore, trade orders having a communication gap can be equally handled. Note that not only when geographical distances are different, but also when performances of communication lines are different, the trade orders can be equally handled.

In addition, since the order information and the trade result information including the trade determination process are recorded in the record storage server 3 and disclosed, it is possible to easily access the order information and the trade result information afterwards and verify the past trade. In particular, this effect enables market participants and governmental regulatory agencies to conduct audits, and provides a reliable trade environment due to the inherent characteristics of the system according to the embodiments that fraud can be discovered and the fraud is easily discovered. On the other hand, in a conventional trade system (currently-operated financial trade system), trade information is stored in a database, and a system such as a data warehouse is separately required in order to analyze the trade information afterwards, audits by market participants and governmental regulatory agencies are limited, and it takes time and cost even if the limitation can be released.

OTHER EMBODIMENTS

The present invention is not limited to the above embodiment, and various modifications can be made without departing from the gist of the present invention.

For example, although the trade aggregation server 1 is illustrated as a device different from the trade servers 2*a*, 2*b*, and 2*c*, the trade aggregation server 1 may be configured integrally with any one of the trade servers 2*a*, 2*b*, and 2*c*. In addition, the record storage server 3 may be configured integrally with the trade aggregation server 1. In addition, if the times of the clock modules of the trade servers 2*a*, 2*b*, and 2*c* are unified, the trade servers 2*a*, 2*b*, and 2*c* may be configured to calibrate each other without using the calibration clock server 6. In addition, if a clock module is provided for each of the clients 4$a_1$, 4$a_2$, 4$b_1$, 4$b_2$, 4$c_1$, and 4$c_2$, the functions of the trade servers 2*a*, 2*b*, and 2*c* may be provided in the clients 4$a_1$, 4$a_2$, 4$b_1$, 4$b_2$, 4$c_1$, and 4$c_2$, and the order information may be directly transmitted from the clients 4$a_1$, 4$a_2$, 4$b_1$, 4$b_2$, 4$c_1$, and 4$c_2$ to the trade aggregation server 1.

In addition, the trade aggregation server 1, the trade servers 2*a*, 2*b*, and 2*c*, the record storage server 3, and the calibration clock server 6 have been described with the configuration of the server device. However, information held by these devices and functions of these devices may be configured on a blockchain including a plurality of server devices.

In addition, the determination means 102 may impose a penalty by causing the closing time to be earlier than the predetermined closing time for each specific trade participant, a trade type, or a trade brand. The requirement for causing the closing time to be earlier may be, for example, a case where a distance from a place where information that greatly affects the entire market is generated to the trade participant is long, or a case where an illegal trade or illegal trade attempt performed previously by a specific trade participant is detected. Specifically, for example, when there is an international commodity future market in which a main trade is performed in Chicago, USA, and a trade participant in Japan and a participant participating in Chicago perform a trade of a high-frequency batch closing at the same time, only the trade participant in Chicago can always perform a trade based on the latest information. For example, when a large buying order is placed in the commodity future market in Chicago immediately before the closing time of the trade, the trade is closed in a state where the information is not transmitted to any server other than a server near the Chicago market due to a communication time (the information is transmitted to Tokyo after the closing time). In this state, when the market participant in Chicago places a buying order in the market and a trade is established, the commodity future can be obtained at a price lower than the market price (attacks in high-frequency trades). To suppress the high-speed trade, when it is detected that the participant in Chicago may be aware of the latest information affecting a next order (when it is detected that a time required to transmit information to the participant in Japan will not be in time for a next closing time, or when a large gap is detected in a time from transmission of the information to the participant in Chicago to an order even if the information is transmitted), the determination means 102 executes a method for imposing a closing time earlier than a standard time for the participant in Chicago and adjusting the closing time according to a distance from an information source, and a method for prohibiting attacks using the communication gap in terms of use or the like and imposing penalties on market participants who attempt such attacks by giving them an earlier trade closing time. Note that since the attack by the high-frequency trade is performed by placing a large number of orders based on the difference in communication time, it is possible to determine the presence or absence of the attack by confirming the trade history of the record storage server 3. The trade history of the record storage server 3 is disclosed to the market participants. Therefore, even if a penalty is not actually imposed, a deterrent against the attack acts by the monitoring eye from the market participants and the rule that a penalty is imposed against the attack.

In addition, as a method for detecting the illegal trade or illegal trade attempt, the following method can be considered. For example, a time when the client makes a decision on the order, that is, a time when the trade server receives an order is recorded, and in a case where the time is extremely biased immediately before closing, it is possible to easily infer that a trade is attempted based on an information gap based on the difference in latency.

In the above embodiment, the functions of the means 100 to 103 and 200 to 202 of the control unit 10 have been implemented by programs. However, all or some of the means may be implemented by hardware such as ASIC. In addition, the programs used in the above embodiment can be provided by being stored in a recording medium such as a CD-ROM. Replacement, removal, addition, and the like of the above steps described in the above embodiment can be performed within the scope not changing the gist of the present invention.

INDUSTRIAL APPLICABILITY

A trade management program, an information processing apparatus, and a trade management system that equally handle trade orders having a communication gap are provided.

REFERENCE SIGNS LIST

1 Trade aggregation server
2*a*, 2*b*, 2*c* Trade server
3 Record storage server
4*a*$_1$, 4*a*$_2$, 4*b*$_1$, 4*b*$_2$, 4*c*$_1$, 4*c*$_2$ Client
5*a*, 5*b*, 5*c*, 5*d* Network
6 Calibration clock server
10 Control unit
11 Storage unit
12 Communication unit
20 Control unit
21 Storage unit
22 Communication unit
23 Clock module
100 Order reception means
101 Order verification means
102 Determination means
103 Trade result output means
110 Trade management program
111 Order information
112 Determination condition information
113 Trade result information
200 Order reception means
201 Verification token generation means
202 Order request means
210 Trade management program
211 Order information
212 Verification token information

The invention claimed is:

1. A non-transitory computer-readable medium containing executable instructions for implementing functions of managing trade, the instructions, when executed by one or more processors of a computer, cause the computer to:

receive a first order information including respective first application times of one or more first orders from a first trade server of plurality of trade servers, wherein the respective first application times are assigned at the first trade server at a timing of receipt of the one or more first orders from clients located in a first geographic region and before transmission of the one or more first orders to a trade aggregation server, the first trade server being installed in a first geographic region and assigning the respective first application times to the one or more first orders, receive an nth order information including respective nth application times of one or more nth orders from an nth trade server of the plurality of trade servers, wherein the respective nth application times are assigned at the nth trade server at a timing of receipt of the one or more nth orders from clients located in an nth geographic region and before transmission of the one or more nth orders to the trade aggregation server, the nth trade server being installed in an nth geographic region that is geographically distant from the first geographic region and assigning the respective nth application times to the one or more nth orders; and determine the first to the nth order information for each predetermined period in an order based on the respective application times, wherein the determining includes determining an execution order of the one or more first orders and the one or more nth orders based on the respective application times assigned at the plurality of trade servers, independent of a communication delay between the plurality of trade servers and the computer.

2. The non-transitory computer-readable medium according to claim 1, wherein each of the plurality of trade servers includes a clock module, each clock module is calibrated to provide a common time reference among the plurality of trade servers, and each of the application time is generated by the clock module at a timing of receipt of each order at the corresponding trade server, and described in each of the order information by each clock module.

3. The non-transitory computer-readable medium according to claim 2, wherein the each clock module has a secret key, creates a token from the secret key, and links the token with the each of the order information together with the each of the application time.

4. The non-transitory computer-readable medium according to claim 3, further implementing a function of verifying the each of the order information using the token.

5. The non-transitory computer-readable medium according to claim 4, wherein a determination result obtained from the determination step is output as trade result information.

6. The non-transitory computer-readable medium according to claim 4, wherein when information affecting a subsequent order does not arrive at one or more geographic regions, or when there is a time difference between arrival of the information and an order time, a closing time of the predetermined period in a geographic region other than the one or more geographic regions is set earlier than closing times of the one or more geographic regions.

7. The non-transitory computer-readable medium according to claim 3, wherein a determination result obtained from the determination step is output as trade result information.

8. The non-transitory computer-readable medium according to claim 3, wherein when information affecting a subsequent order does not arrive at one or more geographic regions, or when there is a time difference between arrival of the information and an order time, a closing time of the predetermined period in a geographic region other than the one or more geographic regions is set earlier than closing times of the one or more geographic regions.

9. The non-transitory computer-readable medium according to claim 2, wherein a determination result obtained from the determination step is output as trade result information.

10. The non-transitory computer-readable medium according to claim 2, wherein when information affecting a subsequent order does not arrive at one or more geographic regions, or when there is a time difference between arrival of the information and an order time, a closing time of the predetermined period in a geographic region other than the one or more geographic regions is set earlier than closing times of the one or more geographic regions.

11. The non-transitory computer-readable medium according to claim 1, wherein a determination result obtained from the determination step is output as trade result information.

12. The non-transitory computer-readable medium according to claim 11, wherein in a case where a fraud or fraud attempt is detected based on the trade result information, a closing time of the predetermined period of a client having made the fraud or fraud attempt is set earlier than closing times of the other clients.

13. The non-transitory computer-readable medium according to claim 11, wherein when information affecting a subsequent order does not arrive at one or more geographic regions, or when there is a time difference between arrival of the information and an order time, a closing time of the predetermined period in a geographic region other than the one or more geographic regions is set earlier than closing times of the one or more geographic regions.

14. The non-transitory computer-readable medium according to claim 1, wherein when information affecting a subsequent order does not arrive at one or more geographic regions, or when there is a time difference between arrival of the information and an order time, a closing time of the predetermined period in a geographic region other than the one or more geographic regions is set earlier than closing times of the one or more geographic regions.

15. The non-transitory computer-readable medium according to claim 1, wherein the first to the nth order information for each predetermined period is determined by the respective first to nth application times.

16. The non-transitory computer-readable medium according to claim 1, wherein the execution order is determined by comparing the application times assigned at the plurality of trade servers without reordering based on arrival timing at the computer.

17. A trade aggregation server comprising:

one or more processors, a non-transitory computer-readable medium containing executable instructions for implementing functions of aggregating trade, the instructions, when executed by the one or more processors of a computer, cause the computer to:

receive a first order information including respective first application times of one or more first orders from a first trade server of plurality of trade servers, wherein the respective first application times are assigned at the first trade server at a timing of receipt of the one or more first orders from clients located in a first geographic region and before transmission of the one or more first orders to a trade aggregation server, the first trade server being installed in a first geographic region and assigning the respective first application times to the one or more first orders, receive an nth order information including respective nth application times of one or more nth orders from an nth trade server of the plurality of trade servers, wherein the respective nth application times are assigned at the nth trade server at a timing of receipt of the one or more nth orders from clients located in an nth geographic region and before transmission of the one or more nth orders to the trade aggregation server, the nth trade server being installed in an nth geographic region that is geographically distant from the first geographic region and assigning the respective nth application times to the one or more nth orders; and determine the first to the nth order information for each predetermined period in an order based on the respective application times, wherein the determining includes determining an execution order of the one or more first orders and the one or more nth orders based on the respective application times assigned at the plurality of trade servers, independent of a communication delay between the plurality of trade servers and the computer.

18. The non-transitory computer-readable medium according to claim 17, wherein the first to the nth order information for each predetermined period is determined by the respective first to nth application times.

19. A trade management system comprising:

a plurality of trade servers located in a plurality of different geographic regions, each of the plurality of trade servers being installed in a corresponding geographically distant geographic region, each of the plurality of trade servers being configured to receive one or more orders from clients located in the corresponding geographic region and assign respective application times to the one or more orders at a timing of receipt of the one or more orders and before transmission of the one or more orders to a trade aggregation server; and assigning respective application times to the one or more orders and receiving the one or more orders from clients located in the same geographic region; and the trade aggregation server configured to receive order information including respective application times for the one or more orders from each of the plurality of the trade servers located in the plurality of the different geographic regions, and determine the order information for each predetermined period in an order based on the respective application times, wherein the trade aggregation server is configured to determine an execution order of the one or more orders based on the respective application times assigned at the plurality of trade servers, independent of a communication delay between the plurality of trade servers and the trade aggregation server.

20. The non-transitory computer-readable medium according to claim 19, wherein the order information for each predetermined period is determined by the respective application times.

* * * * *